May 5, 1942.                J. ZIPPAY                 2,281,655
                           NONSKID DEVICE
                         Filed Jan. 23, 1941

Inventor
John Zippay

By Clarence A. O'Brien

Attorney

Patented May 5, 1942

2,281,655

UNITED STATES PATENT OFFICE 2,281,655

NONSKID DEVICE

John Zippay, Charleroi, Pa.

Application January 23, 1941, Serial No. 375,685

1 Claim. (Cl. 24—234)

This invention relates to non-skid devices for motor vehicles of all kinds and more particularly to quick detachable cross chains whereby the latter when broken or worn beyond satisfactory use may be easily and quickly detached from the side chains and new ones substituted in lieu thereof, consequently permitting repairs of this kind to be readily carried out under most trying weather conditions with the least possible discomfort to the persons making the repair.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a transverse sectional view illustrating a motor vehicle tire equipped with a non-skid device constructed in accordance with my invention.

Figure 1:
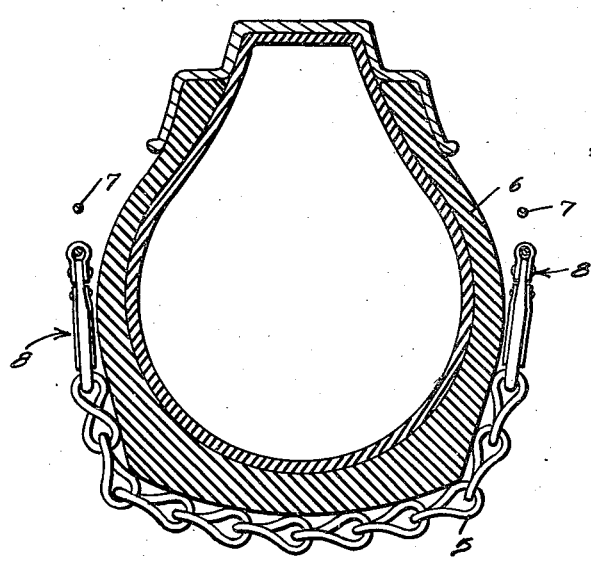
Figure 2:
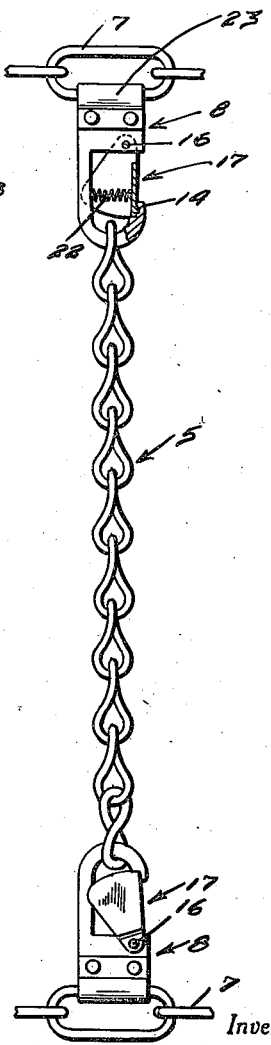
Figure 2 is a plan view partly in section illustrating a cross chain of the non-skid device and showing the means of detachably connecting the cross chain to the side chains of the non-skid device.
Figure 3:
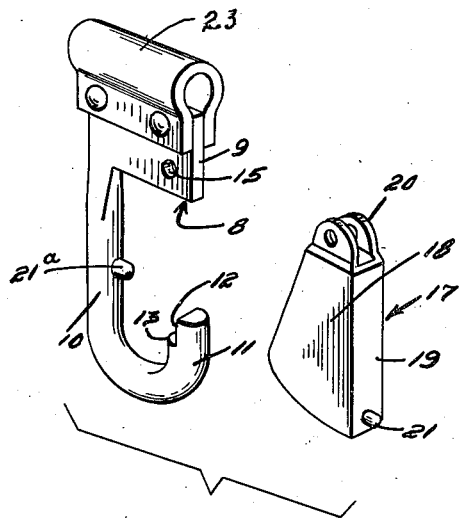
Figure 3 is a perspective view illustrating one of the fasteners with the pivotal tongue thereof separated from the fastener proper.

Referring in detail to the drawing, the numeral 5 indicates a cross chain of a non-skid device especially adapted for use on a tire 6. It is a well known fact that cross chains of a non-skid device rapidly wear and become broken leaving loose ends to interfere with the operation of a motor vehicle. Further it has been the practice of attaching cross chains to the side chains 7 permanently requiring the use of cutters or similar tools in removing cross chains when broken, all of which takes time and prevents repairs from being carried out upon the road. In some instances repair links have been employed. However, the use of such devices have proven impractical owing to the fact that frequently the cross chains when broken catch into parts of the vehicle and become broken the second time making the cross chains too short to mend and even if the repair links are employed, the cross chains in some instances must be cut by a suitable tool to detach them from the side chains of the non-skid device especially when it is desired to replace the entire cross chain due to its fragile condition from wear.

It is proposed to eliminate all of these difficulties through the use of special fasteners 8 which will permit the ends of the cross chain to be quickly attached and detached from the side chains when desired. The special fasteners are in the form of snap fasteners whereby a person through the pressure of a thumb upon the hinged tongue may readily pass the link of a cross chain into and out of the hook portion. It is to be noted that the fasteners are so constructed, and which will be hereinafter more fully described in detail, as to prevent accidental detachment of the cross chain from the side chains.

Each fastener 8 consists of a substantially rectangular shaped rigid portion 9 on which is formed a shank 10 terminating in a bill portion 11, the free end of which is stepped, as shown at 12, forming a shoulder 13. One face of the stepped end of the bill portion is provided with a socket 14. The shank 10 extends from one corner of the rigid plate 9 and the latter adjacent an opposite corner is provided with a pivot opening 15 to receive a pivot pin 16 which pivotally connects to the rigid plate a tongue 17. The tongue is of channeled formation including side walls 18 and an end wall 19. The side walls are substantially triangular shaped and extend slightly beyond one end of the end wall and reduced to form apertured ears 20 which receive the pivot pin 16.

The end wall 19 adjacent the free end thereof is provided with a projection 21 adapted to enter the socket 14 of the bill portion when the tongue is in a position of closing the fastener. Confined within the side walls and bearing against the end wall 19 as well as the projection 21a on the shank 10 is a coil spring 22 normally acting to urge the tongue into position of closing the bill portion. A simple pressure upon the end wall 19 of the tongue 17 will cause the latter to pivot in the direction of the shank opening the bill portion so that an end link of a cross chain may be readily applied thereto or removed therefrom when desired.

The tongue 17 being of channeled formation as described will tend to protect the spring against foreign matter. Thus it will be seen that a novel construction of fastener has been provided especially adaptable for detachably securing a cross chain to the side chain of a non-skid device. A split sleeve 23 is secured on the plate 9 of the fastener and receives therein a link of a side chain thereby parmanently attaching the fastener to the side chain.

From the foregoing description taken in connection with the accompanying drawing it will be seen that when a non-skid device is made up with a series of fasteners applied to the side chains thereof cross chains can be easily and quickly applied and detached therefrom when desired.

While I have shown and described the preferred embodiment of my invention, it will be understood that minor changes in construction, combination and arrangement of parts may be made without departing from the spirit and scope of the invention as claimed.

Having thus described the invention what I claim is:

In a non-skid device of the character described, a fastener for detachably connecting the end of a side chain with the cross chain of such device, said fastener embodying a rigid plate having integral therewith a shank terminating in a bill portion adapted to be engaged with the end link of a cross chain, a retaining tongue pivoted on said plate and having an end portion engageable with the free end of the bill, a spring interposed between said shank and said tongue and connected at its opposite ends with said tongue and shank respectively for urging the tongue into a position closing the bill portion of the fastener, said bill portion of the fastener at the free end thereof provided with a socket disposed transversely of said end portion and opening outwardly of said end portion in the general direction of said shank, a pin projecting from the end portion of said tongue and engaging in said socket whan said tongue is in the aforementioned position closing the bill portion; and a split sleeve having the edges thereof formed by said split secured to the plate, said sleeve adapted to have a side chain threaded therethrough.

JOHN ZIPPAY.